United States Patent
Gunawan

(10) Patent No.: US 9,387,732 B1
(45) Date of Patent: Jul. 12, 2016

(54) TIRE PRESSURE MONITORING SYSTEM (TPMS) ACTIVATION METHOD

(75) Inventor: Agustinus Gunawan, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1947 days.

(21) Appl. No.: 12/536,099

(22) Filed: Aug. 5, 2009

(51) Int. Cl.
*B60C 23/00* (2006.01)
*B60C 23/04* (2006.01)

(52) U.S. Cl.
CPC ......... *B60C 23/0408* (2013.01); *B60C 23/0444* (2013.01)

(58) Field of Classification Search
USPC ......................................... 340/445, 442, 447
See application file for complete search history.

(56) References Cited

U.S. PATENT DOCUMENTS

| | | | |
|---|---|---|---|
| 6,693,522 B2 | 2/2004 | Tang et al. | |
| 6,710,708 B2 | 3/2004 | McClelland et al. | |
| 6,906,624 B2 | 6/2005 | McClelland et al. | |
| 6,945,087 B2 | 9/2005 | Porter et al. | |
| 6,958,685 B2 | 10/2005 | Desai | |
| 6,965,305 B2 | 11/2005 | Taguchi et al. | |
| 6,978,196 B2 | 12/2005 | Albertus | |
| 6,997,048 B2 | 2/2006 | Komatsu et al. | |
| 7,009,491 B2 | 3/2006 | Rodriguez et al. | |
| 7,068,158 B2 | 6/2006 | Komatsu et al. | |
| 7,088,226 B2 | 8/2006 | McClelland et al. | |
| 7,091,840 B2 | 8/2006 | Ichinose | |
| 7,173,520 B2 | 2/2007 | Desai et al. | |
| 7,231,274 B2 | 6/2007 | Moulds et al. | |
| 7,337,659 B2 | 3/2008 | Naidu et al. | |
| 7,339,461 B2 | 3/2008 | Orita et al. | |
| 7,437,921 B2 | 10/2008 | Delaporte | |
| 2003/0156025 A1* | 8/2003 | Okubo | B60C 23/0416 340/447 |
| 2006/0001533 A1 | 1/2006 | Bessho et al. | |
| 2006/0158324 A1 | 7/2006 | Kramer | |
| 2008/0100430 A1 | 5/2008 | Kochie et al. | |
| 2008/0103718 A1 | 5/2008 | Miller | |
| 2008/0143506 A1 | 6/2008 | Kochie et al. | |
| 2009/0058626 A1* | 3/2009 | Watabe | B60C 23/0416 340/447 |
| 2009/0256694 A1* | 10/2009 | Bettecken | B60C 23/0408 340/442 |
| 2009/0303009 A1* | 12/2009 | Itasaki | H04Q 9/00 340/10.1 |
| 2009/0319121 A1* | 12/2009 | MacDonald | G01M 17/007 701/31.4 |

FOREIGN PATENT DOCUMENTS

| | | |
|---|---|---|
| JP | 10504783 | 5/1998 |
| JP | 2004526217 | 8/2004 |
| JP | 2006275909 | 10/2006 |
| JP | 2007511416 | 5/2007 |
| JP | 2008538540 | 10/2008 |

OTHER PUBLICATIONS

Office Action of JP Serial No. 2010-171957 dated Feb. 18, 2014, 4 pages.

* cited by examiner

*Primary Examiner* — Jack K Wang
(74) *Attorney, Agent, or Firm* — Rankin, Hill & Clark LLP

(57) ABSTRACT

A method for initiating and verifying operation of one or more tire pressure sensors is described. The process can be performed after installation of the sensors in vehicle wheels.

25 Claims, 4 Drawing Sheets

TIRE PRESSURE MONITORING SYSTEM (TPMS) ACTIVATION METHOD

FIELD OF THE INVENTION

The present invention relates to activating one or more sensors and particularly tire pressure sensors and associated systems on board a motorcycle or other vehicle.

BACKGROUND OF THE INVENTION

A Tire Pressure Monitoring System (TPMS) is generally an electronic system designed to monitor the air pressure inside pneumatic tires on automobiles, trucks, airplane undercarriages, motorcycles, and other vehicles. The system is also sometimes referred to as a Tire Pressure Indication System (TPIS). These systems report real time tire pressure information to the driver of the vehicle, either via a gauge, an electronic display, or a simple low pressure warning light.

Although first incorporated in automobiles, TPMS's are now popular features for motorcycles. Although numerous sensor configurations for various types of vehicles are known, direct sensing of pneumatic pressure is preferred over indirect techniques, particularly for motorcycles. Direct sensor TPMS's employ physical pressure sensors inside each tire, and a means of processing and sending information obtained by each sensor associated with a tire to the vehicle's instrument cluster. In order to transfer data from a rotating wheel, direct sensor TPMS's may use a radio frequency (RF) communication channel.

The TPMS must be installed and tested in the motorcycle manufacturing environment. A typical process is generally as follows. The TPMS sensors are attached to the wheel during the wheel and tire assembly process. The wheels are then attached to the vehicle. This is the first point at which the TPMS can be clearly associated with the vehicle. In the case of battery powered RF systems, it is at this assembly stage that RF antennas are used to extract the unique identification addresses of the TPMS sensors. These addresses, and their associated wheel on the vehicle are downloaded to the vehicle management unit or other controller. This enables warnings to be associated with low tire pressure.

More specifically for multi-mode sensors, activation of a tire pressure sensor monitoring system incorporated in a motorcycle typically involves a series of operations. First, sensors installed on each wheel of the bike must be initiated or otherwise activated from a "sleep" mode. Most OEM sensor suppliers place sensors in a power-saving sleep mode prior to shipment or inventory storage. The sensors are initiated or otherwise activated and their mode changed from "sleep" to "test." Once in "test" mode, the identification address or ID of each sensor is registered with the motorcycle receiver or controller. In another series of operations, verification that the TPMS and sensors are working properly is conducted. Verification is typically performed at least one hour and up to one day or more after initiation and registration of the sensors. During the verification operation(s), if an operator determines that the system is operating correctly, then the sensors are placed into a battery-conserving "park" mode.

Although current methods for activating a motorcycle TPMS are satisfactory, significant operator involvement is required. This, as will be appreciated, results in increased costs and assembly time. Accordingly, a need exists for an improved method of activating and verifying a TPMS.

SUMMARY OF THE INVENTION

The difficulties and drawbacks associated with previously known systems and associated methods are overcome in the present method for initiating and verifying operation of a tire pressure monitoring system.

In a first aspect, the present invention provides a method for initiating and verifying operation of at least one tire pressure sensor having multiple modes including a sleep mode, a test mode, and a park mode. The method comprises changing the mode of a sensor from a sleep mode to a test mode, transmitting information from the sensor to a receiver, the receiver processing the information, transmitting information again from the sensor to the receiver, the receiver processing the information, and changing the mode of the sensor from the test mode to a park mode.

In yet another aspect, the present invention provides a method for initiating and verifying operation of at least one tire pressure sensor having a plurality of modes. The method comprises (i) transmitting a signal to change a sensor from a power-conserving first mode to an information-providing second mode, (ii) causing the sensor to transmit information, and (iii) processing the information from the sensor. The method further comprises (iv) determining whether the sensor is operating acceptably, whereby if the determination is that the sensor is not acceptably operating, repeating step (iii) and if the determination is that the sensor is acceptably operating, repeating steps (i), (ii), and (iii) and then proceeding to step (v). The method also comprises (v) determining again whether the sensor is operating acceptably, whereby if the determination is that the sensor is not acceptably operating, repeating steps (i), (ii), (iii) and (iv) one time, and if the determination is that the sensor is acceptably operating, proceeding to step (vi). The method additionally comprises (vi) transmitting a signal to change the sensor from the second mode to a third mode.

In still another aspect, the present invention provides a method for initiating and verifying operation of at least one tire pressure sensor having a plurality of modes. The method comprises (i) transmitting a signal to change a sensor from a first mode to a second mode; (ii) causing the sensor to transmit information; (iii) processing the information from the sensor; (iv) determining whether the sensor is operating acceptably, whereby if the determination is that the sensor is not acceptably operating, reprocessing the information from the sensor, and if the determination is that the sensor is acceptably operating, proceeding to step (v); (v) transmitting a signal for the sensor to be in the second mode; (vi) causing the sensor to transmit information; (vii) processing the information from the sensor; (viii) determining whether the sensor is operating acceptably, whereby if the determination is that the sensor is not acceptably operating, repeating steps (i), (ii), (iii), (iv), (v), and (vii) one time, and if the determination is that the sensor is acceptably operating, proceeding to step (ix); and (ix) transmitting a signal to change the sensor from the second mode to a third mode.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

In accordance with the present invention, a process is provided in which one or more and preferably all tire pressure sensors on a motorcycle are initiated, placed into communication with a receiver/controller, and their operation verified in a continuous and automatic fashion. In addition, an improved verification strategy is provided in which relatively high operating success rates for TPMS's can be achieved.

The present invention method is directed to initiating and verifying operation of one or more tire pressure sensors, and particularly to sensors having multiple modes or states. Typically, such sensors have a power-conserving mode. While in this mode, the sensor does not transmit. Sensors are usually shipped in this mode to conserve battery power. Sensors may also include a test mode. While in such a test mode, sensors transmit information which for example may include identifying information related to the particular sensor such as address information. While in the test mode, sensors may also transmit information relating to detected physical conditions such as acceleration, temperature, and pressure. Sensors may further include a parking mode. While in this mode, transmission does not occur. However, the sensor may be measuring physical conditions with or without data storage. And, sensors generally include a driving mode. While in this mode, sensors measure various physical conditions and transmit information relating to the measured conditions. Changes between modes may occur automatically such as upon detection of certain conditions, e.g. acceleration, and/or may also occur as a result of operator selection.

Figure 1:
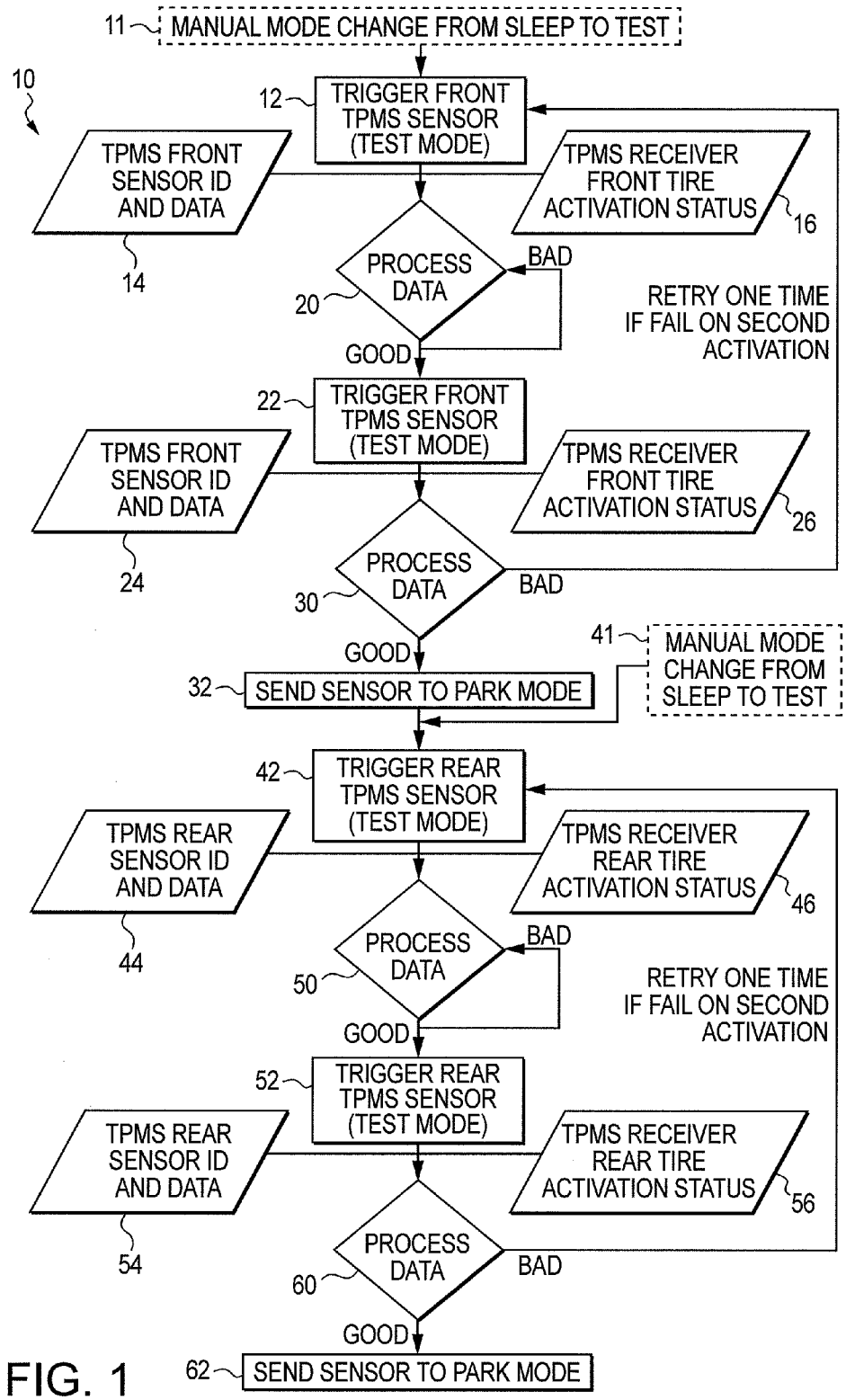
FIG. 1 is a process flowchart illustrating a preferred embodiment method in accordance with the present invention.
Figure 2:
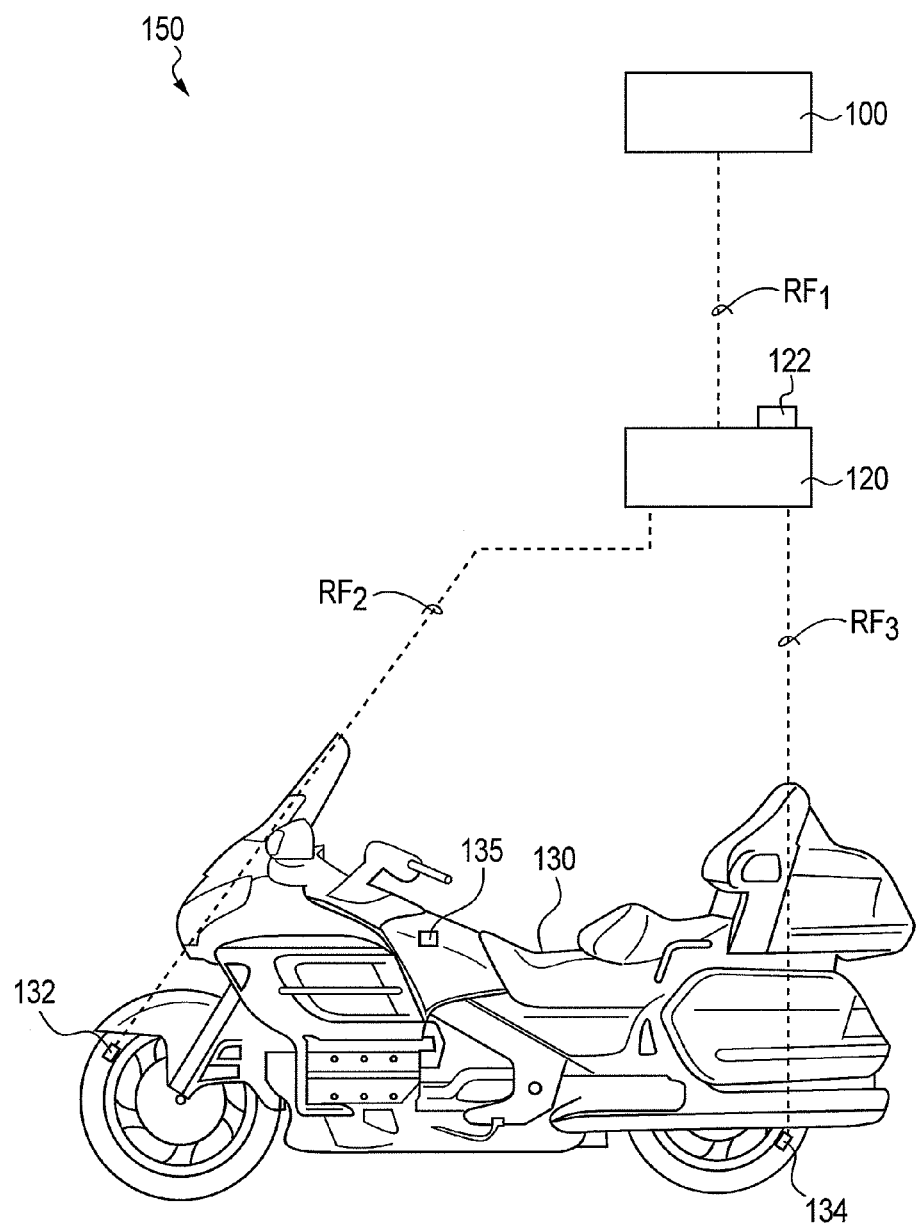
FIG. 2 is a schematic illustration of a system for initiating and verifying a tire pressure monitoring system.

FIG. 1 is a process flowchart illustrating a preferred embodiment method in accordance with the present invention. This process is preferably performed using a system interfaced to one or more sensors, such as shown in FIG. 2. FIG. 2 is a schematic illustration depicting a system 150 for initiating and verifying sensor operation in a TPMS on a motorcycle 130. The system 150 includes a receiver unit 100 and a remote trigger switch 120. The trigger switch 120 may include a pushbutton 122 or other actuator with communication receiving and transmitting provisions. The trigger switch 120 is preferably remote from the receiver unit 100 and communicates with unit 100 by wireless radio communication shown as $RF_1$. The trigger switch 120 communicates with a first sensor 132 on the motorcycle 130 via signal $RF_2$, and with a second sensor 134 on the motorcycle 130 via $RF_3$. Although the system 150 is depicted in FIG. 2 as using wireless communication, it will be understood that the present invention methods may be performed using cable or other connections between the trigger switch 120 and one or more sensor(s) 132, 134 on the motorcycle 130. The motorcycle 130 includes an onboard tire pressure monitoring system controller 135 which receives information from the sensors 132 and 134, typically during normal operation.

As previously noted, OEM suppliers typically place sensors in a sleep mode for shipment. Prior to or after incorporation in a wheel, tire pressure sensors may optionally be manually switched from a sleep mode to a test mode. Referring to FIG. 1, this optional operation is shown as item 11.

Typically, this mode change is performed manually and is done prior to installation of the sensor in the wheel. This manual mode change is optional since in many instances, a sensor may remain in a sleep mode prior to and until initiation of the preferred process described herein. Referring to FIG. 1, the preferred embodiment method 10 comprises a first trigger operation 12 in which the state of a first tire pressure sensor such as sensor 132 associated with a front wheel of the motorcycle 130 in FIG. 2 is changed from "sleep" mode to "test" mode. It will be appreciated that the trigger operation 12 may merely confirm that the sensor is already in a test mode, or may repeat the mode change from another mode to a test mode. The operation 12 is initiated by actuating pushbutton 122 of the trigger switch 120 shown in FIG. 2. The trigger switch 120 then sends a signal to the first sensor 132. That signal changes the mode of the sensor from "sleep" to "test." Pursuant to this mode change, the first sensor 132 transmits its unique identifying information or ID to the trigger switch 120 which transmits the information to the receiver 100 as shown in FIG. 2. This is shown as block 14 in FIG. 1. Status of the mode change from "sleep" to "test" is sent from the sensor 132 to the trigger switch 120 and then to the receiver 100, as shown in block 16. The receiver 100 processes the information received from the sensor 132, as represented by block 20. If the receiver 100 determines that the information from the sensor 132 is acceptable or "good," then a reactivation operation of the sensor 132 is performed. Preferably, the receiver 100 determines whether the sensor 132 is operating within acceptable limits. As explained in greater detail herein, it has been discovered that sensor registration failure rates can be reduced by reactivating sensors a second time. Thus, referring to FIG. 1, if data from operation 20 is determined to be acceptable, then the sensor 132 is reactivated at block 22. If the data is determined to not be acceptable and thus "bad," the processing operation of block 20 is repeated.

As shown in block 22, a signal to place the sensor in "test" mode is sent a second time from the receiver 100 to the trigger switch 120 and then to the sensor 132. This operation preferably occurs automatically and does not require operator involvement such as by actuating the pushbutton 122 of the trigger switch 120. The sensor 132 transmits (again) its unique identifying information or ID to the trigger switch 120 which transmits the information to the receiver 100. This is denoted as block 24 in FIG. 1. Confirmation status of the mode change to "test" is shown in block 26. The receiver 100 processes the information received from the sensor 132 as represented by block 30. If data from operation 30 is determined to be acceptable, then the sensor 132 is placed into "park" mode as shown by block 32. If the data from sensor 132 operation 30 is determined to not be acceptable, then the process is repeated, and preferably repeated once, specifically beginning at operation 12.

After placing the sensor 132 in park mode, the process awaits an operator to trigger actuation, mode change and verification of a second sensor such as sensor 134 associated with a rear wheel of the motorcycle 130 as shown in FIG. 2.

As previously explained, the sensor associated with a rear wheel may also optionally be manually switched from a sleep mode to a test mode. This operation, is shown by block 41 in FIG. 1. Referring further to FIG. 1, the preferred embodiment method 10 comprises a second trigger operation 42 in which the state of a second sensor such as sensor 134 in FIG. 2 is changed from "sleep" mode to "test" mode. It will be appreciated that the trigger operation 42 may merely confirm that the sensor is already in a test mode, or may repeat the mode change from another mode to a test mode. The operation 42 is initiated by actuating pushbutton 122 of the trigger switch 120 shown in FIG. 2. The trigger switch 120 then sends a signal to the second sensor 134. Pursuant to this mode change, the second sensor 134 transmits its unique identifying information or ID to the trigger switch 120 which then sends the information to the receiver 100 as shown in FIG. 2. This is shown as block 44 in FIG. 1. Status of the mode change from "sleep" to "test" is sent from the sensor 134 to the trigger switch 120 and then to the receiver 100 as shown in block 46. The receiver 100 processes the information received from the sensor 134, as represented by block 50. If the receiver 100 determines that the information from the sensor 134 is acceptable or "good," then a reactivation operation of the sensor 134 is performed. Preferably, the receiver 100 determines whether the sensor 134 is operating within acceptable limits. As explained in greater detail herein, it has been discovered that sensor registration failure rates can be reduced by reactivating sensors a second time. Thus, referring to FIG. 1, if data from operation 50 is determined to be acceptable, then the sensor 134 is reactivated by block 52. If the data is determined to not be acceptable and thus "bad," the processing operation of block 50 is repeated.

As shown in block 52, a signal to place the sensor 134 in "test" mode is sent from the receiver 100 to the trigger switch 120 and then to the sensor 134. This operation preferably occurs automatically and does not require operator involvement such as by actuating the pushbutton 122 of the trigger switch 120. The sensor 134 transmits (again) its unique identifying information or ID to the trigger switch 120 which transmits information to the receiver 100. This is denoted as block 54 in FIG. 1. Confirmation of the mode being "test" is shown in block 56. The receiver 100 processes the information received from the sensor 134 as represented by block 60. If data from operation 60 is determined to be acceptable, then the sensor 134 is placed into "park" mode as shown in block 62. If the data from sensor 134 is determined to not be acceptable, then the process is repeated, and preferably repeated once, specifically beginning at operation 42.

Figure 3:
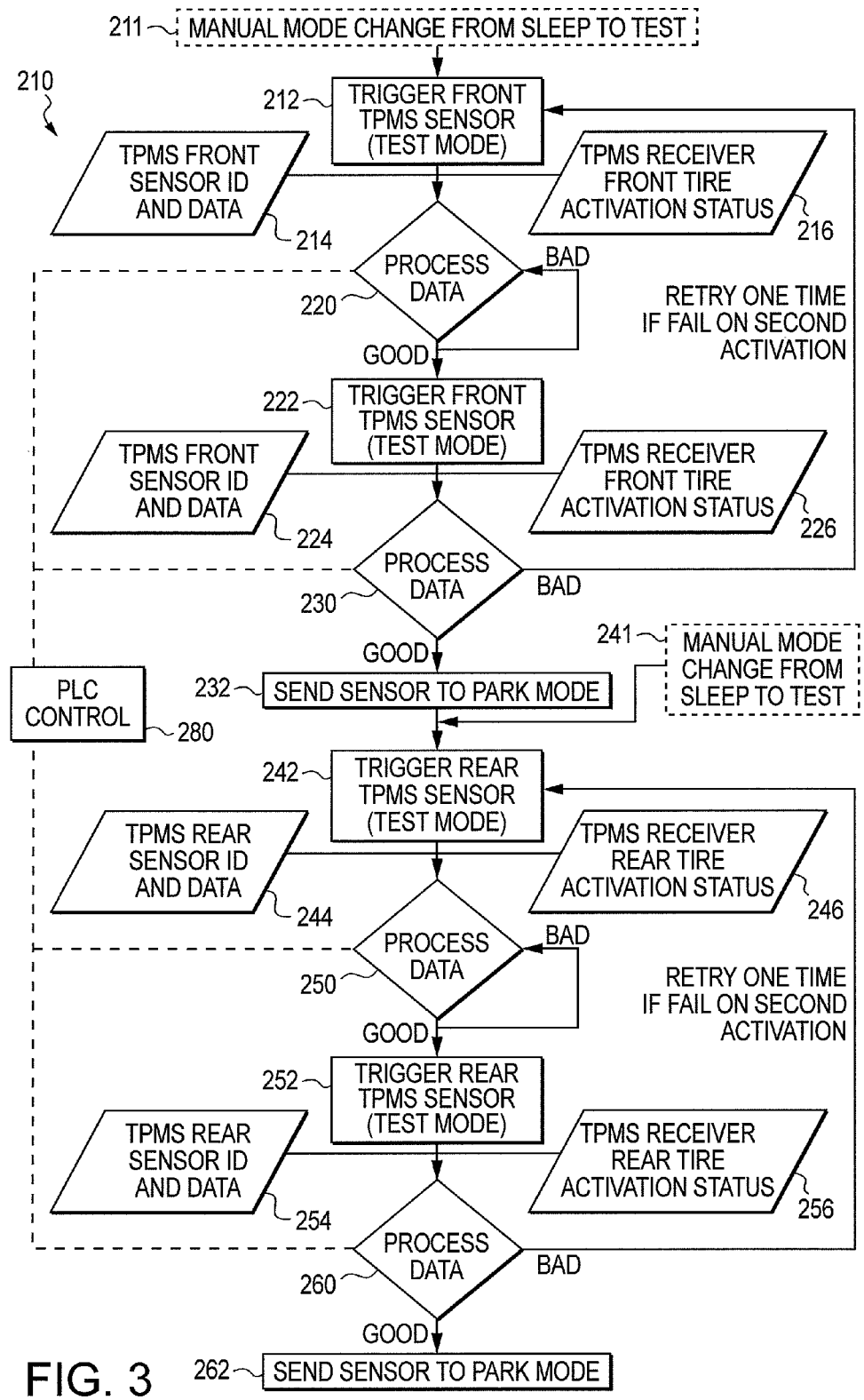
FIG. 3 is a process flowchart illustrating another preferred embodiment method in accordance with the present invention.
Figure 4:
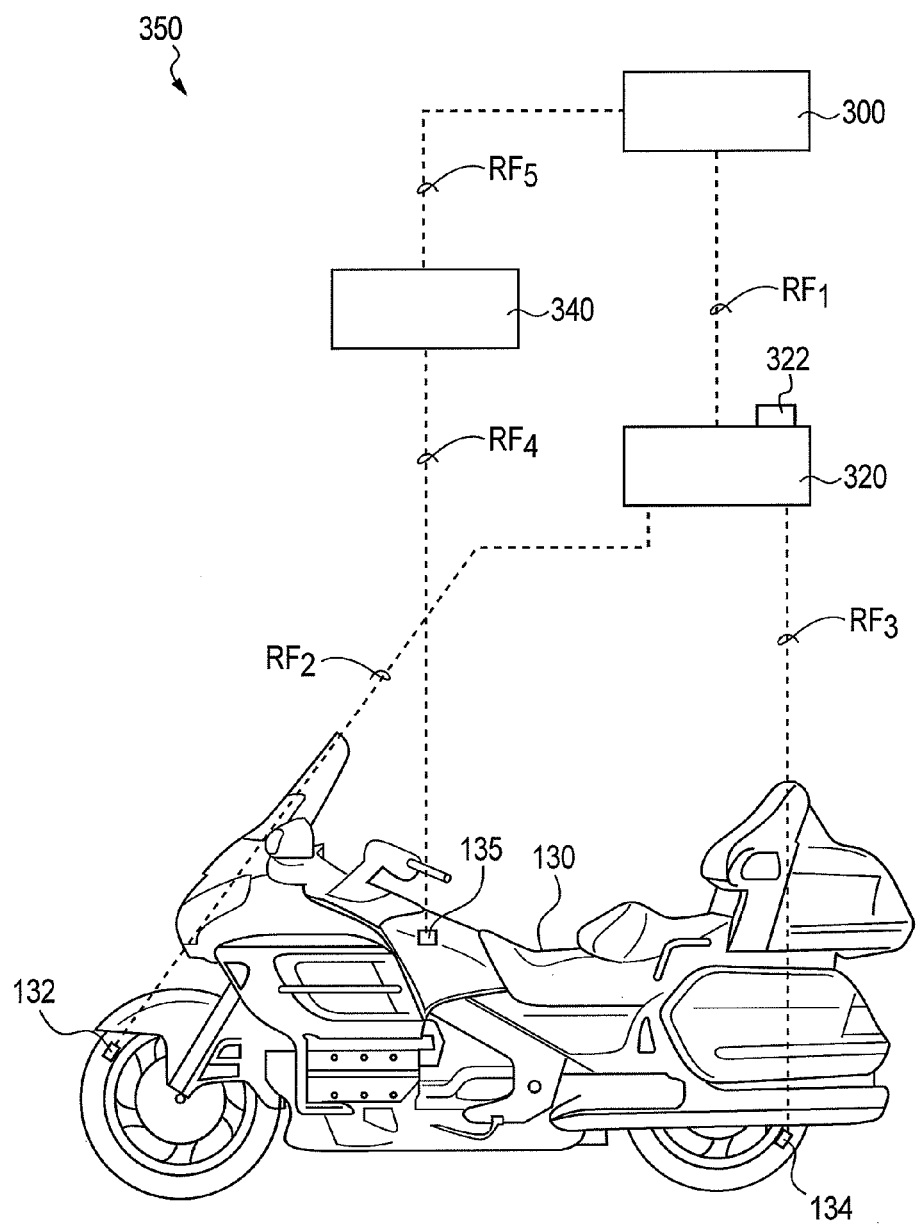
FIG. 4 is a schematic illustration of another system for initiating and verifying a tire pressure monitoring system.

FIG. 3 is a process flowchart illustrating another preferred embodiment method in accordance with the present invention. This process is preferably performed using a system interfaced to one or more sensors, such as shown in FIG. 4. FIG. 4 is a schematic illustration depicting a system 350 for initiating and verifying sensor operation in a TPMS on a motorcycle 130. The system 350 includes a receiver unit 300 and a remote trigger switch 320. The trigger switch 320 may include a pushbutton 322 or other actuator with communication receiving and transmitting provisions. The trigger switch 320 is preferably remote from the receiver unit 300 and communicates with unit 300 by wireless radio communication shown as $RF_1$. The trigger switch 320 communicates with a first sensor 132 on the motorcycle 130 via signal $RF_2$, and with a second sensor 134 on the motorcycle 130 via $RF_3$. The system 350 also preferably includes a programmable logic controller (PLC) 340. The PLC is preferably in communication with the receiver 300 by communication $RF_5$. The PLC may also be in communication with an onboard controller 135, previously described in conjunction with the system of FIG. 2. Although the system 350 is depicted in FIG. 4 as using wireless communication, it will be understood that the present invention methods may be performed using cable or other connections between the various components and one or more sensor(s) 132, 134 on the motorcycle 130. The onboard tire pressure monitoring system controller 135 typically receives information from the sensors 132 and 134 during normal operation.

As previously explained, prior to or after incorporation in a wheel, tire pressure sensors may optionally be switched from a sleep mode to a test mode. This optional operation is shown as item 211 in FIG. 3. Typically, this mode change is performed manually and is done prior to installation of the sensor in the wheel. This manual mode change is optional since in many instances, a sensor may remain in a sleep mode prior to initiation of the preferred process described herein. Referring to FIG. 3, another preferred embodiment method 210 comprises a first trigger operation 212 in which the state of a first tire pressure sensor such as sensor 132 in FIG. 4 is changed from "sleep" mode to "test" mode. It will be appreciated that the trigger operation 212 may merely confirm that the sensor is already in a test mode, or may repeat the mode change from another mode to a test mode. The operation 212 is initiated by actuating pushbutton 322 of the trigger switch 320 shown in FIG. 4. The trigger switch 320 then sends a signal to the first sensor 132. That signal changes the mode of the sensor from "sleep" to "test." Pursuant to this mode change, the first sensor 132 transmits its unique identifying information or ID to the trigger switch 320 which transmits the information to the receiver 300 as shown in FIG. 4. This is shown as block 214 in FIG. 3. Status of the mode change from "sleep" to "test" is sent from the sensor 132 to the trigger switch 320 and then to the receiver 300, as shown in block 216. The receiver 300 obtains the information received from the sensor 132, as represented by block 220. Preferably, a PLC, shown as block 280, receives the information from the receiver 300 and determines whether the sensor 132 is operating within acceptable limits. If the PLC 280 determines that the information from the sensor 132 via the receiver 300 is acceptable or "good," then a reactivation operation of the sensor 132 is performed. As explained in greater detail herein, it has been discovered that sensor registration failure rates can be reduced by reactivating sensors a second time. Thus, referring to FIG. 3, if data from operation 220 is determined to be acceptable, then the sensor 132 is reactivated at block 222. If the data is determined to not be acceptable and thus "bad," the processing operation of block 220 is repeated. In accordance with this preferred method 210, the determination of whether the sensor is operating properly is made by a PLC, shown as block 280.

As shown in block 222, a signal to place the sensor in "test" mode is sent a second time from the receiver 300 to the trigger switch 320 and then to the sensor 132. This operation preferably occurs automatically and does not require operator involvement such as by actuating the pushbutton 322 of the trigger switch 320. The sensor 132 transmits (again) its unique identifying information or ID to the trigger switch 320 which transmits the information to the receiver 300. This is denoted as block 224 in FIG. 3. Confirmation status of the mode change to "test" is shown in block 226. The receiver 300 obtains the information received from the sensor 132 as represented by block 230. If data from operation 230 is determined to be acceptable by the PLC 280, then the sensor 132 is placed into "park" mode as shown by block 232. If the data from sensor 132 in operation 230 is determined to not be acceptable, then the process is repeated, and preferably repeated once, specifically beginning at operation 212.

After placing the sensor 132 in park mode, the process awaits an operator to trigger actuation, mode change and verification of a second sensor such as sensor 134 associated with a rear wheel of the motorcycle 130 as shown in FIG. 4.

As previously explained, the sensor associated with a rear wheel may also optionally be manually switched from a sleep mode to a test mode. This operation, is shown by item 241 in FIG. 3. Referring further to FIG. 3, the preferred embodiment method 210 comprises a second trigger operation 242 in which the state of a second sensor such as sensor 134 in FIG.

4 is changed from "sleep" mode to "test" mode. It will be appreciated that the trigger operation 242 may merely confirm that the sensor is already in a test mode, or may repeat the mode change from another mode to a test mode. The operation 242 is initiated by actuating pushbutton 322 of the trigger switch 320 shown in FIG. 4. The trigger switch 320 then sends a signal to the second sensor 134. Pursuant to this mode change, the second sensor 134 transmits its unique identifying information or ID to the trigger switch 320 which then transmits the information to the receiver 300 as shown in FIG. 4. This is shown as block 244 in FIG. 3. Status of the mode change from "sleep" to "test" is sent from the sensor 134 to the trigger switch 320 and then to the receiver 300 as shown in block 246. The receiver 300 obtains the information received from the sensor 134, as represented by block 250. Preferably, the PLC 280 determines whether the sensor 134 is operating within acceptable limits. If the PLC 280 determines that the information from the sensor 134 via the receiver 300 is acceptable or "good," then a reactivation operation of the sensor 134 is performed. As explained in greater detail herein, it has been discovered that sensor registration failure rates can be reduced by reactivating sensors a second time. Thus, referring to FIG. 3, if data from operation 250 is determined to be acceptable by the PLC 280, then the sensor 134 is reactivated by block 252. If the data is determined to not be acceptable and thus "bad," the processing operation of block 250 is repeated.

As shown in block 252, a signal to place the sensor 134 in "test" mode is sent from the receiver 300 to the trigger switch 320 and then to the sensor 134. This operation preferably occurs automatically and does not require operator involvement such as by actuating the pushbutton 322 of the trigger switch 320. The sensor 134 transmits (again) its unique identifying information or ID to the trigger switch 320 which transmits information to the receiver 300. This is denoted as block 254 in FIG. 3. Confirmation of the mode being "test" is shown in block 256. The PLC 280 processes the information received from the sensor 134 as represented by block 260. If data from operation 260 is determined to be acceptable by PLC 280, then the sensor 134 is placed into "park" mode as shown in block 262. If the data from sensor 134 is determined to not be acceptable, then the process is repeated, and preferably repeated once, specifically beginning at operation 242.

It will be appreciated that the present invention includes processes in which a rear wheel sensor is processed first and then the front wheel sensor is processed. The invention also includes variant methods in which sensors for both a front wheel and for a back wheel are simultaneously initiated and verified.

The process 10 of FIG. 1 is preferably performed by the receiver 100 shown in FIG. 2. The process 210 of FIG. 3 is preferably performed by the receiver 300 and the PLC 340 shown in FIG. 4. As will be understood, the receiver 100, 300 includes electronic processors and memory for algorithmically performing the processes 10 and 210. An example of an electronic processing and controller device using RF channels for communicating with external devices and suitable for use as the receiver 100, 300 is an ATEQ instrument available under the designation VT520 from ATEQ Corporation of Canton, Mich. Programmable logic controllers (PLCs) are commercially available from numerous sources.

The present invention includes systems corresponding to the system depicted in FIGS. 2 and 4 in which one or more additional computers and/or controllers or memory devices are interfaced with the receiver 100, 300, the switches 120, 320, the PLC 340, and/or the motorcycle 130.

It is preferred that the various methods described and depicted in FIGS. 1 and 3 be performed algorithmically, such as by an electronic microprocessor with sufficient memory and/or interfacing provisions. A wide array of computing devices and the like are known in the art for this purpose.

The previously described methods and particularly including the method depicted in FIGS. 1 and 3, preferably include "timing out" provisions such that if conditions are detected such that the process is excessively repeating, the process will be discontinued and may enter a wait state or other condition. Moreover, it is contemplated that one or more warning indicators may be provided to communicate such to an operator.

It has been discovered that significant advantages can be achieved by activating sensors two or more times. That is, significantly higher success rates in sensor activation and verification of proper sensor operation are achieved by performing a sensor activation procedure multiple times. Success rates of nearly 100% in a variety of testing situations have been achieved by performing sensor activation and verification two or more times.

The present invention may be used in conjunction with tire pressure sensors used in a variety of vehicles. Although the invention is described in association with two wheeled vehicles such as motorcycles, the invention can be applied to other vehicles such as automobiles, trucks, trailers, planes, and the like.

Additional details and aspects of monitoring vehicle tire pressure are described in US Patent Application Publication US 2006/0001533 and U.S. Pat. Nos. 7,339,461; 7,091,840; 6,997,048; and 7,068,158.

Many other benefits will no doubt become apparent from future application and development of this technology.

All patents, published applications, and articles noted herein are hereby incorporated by reference in their entirety.

As described hereinabove, the present invention solves many problems associated with previous type devices and methods. However, it will be appreciated that various changes in the details, materials and arrangements of parts and steps, which have been herein described and illustrated in order to explain the nature of the invention, may be made by those skilled in the art without departing from the principle and scope of the invention, as expressed in the appended claims.

What is claimed is:

1. A method for initiating and verifying operation of at least one tire pressure sensor having a plurality of modes, the method comprising:
   (i) transmitting a signal to change a sensor from a power-conserving first mode to an information-providing second mode;
   (ii) causing the sensor to transmit information;
   (iii) processing the information from the sensor;
   (iv) determining whether the sensor is operating acceptably, whereby if the determination is that the sensor is not acceptably operating, repeating step (iii) and if the determination is that the sensor is acceptably operating, repeating steps (i), (ii), and (iii) and then proceeding to step (v);
   (v) determining again whether the sensor is operating acceptably, whereby if the determination is that the sensor is not acceptably operating, repeating steps (i), (ii), (iii) and (iv) one time, and if the determination is that the sensor is acceptably operating, proceeding to step (vi);
   (vi) transmitting a signal to change the sensor from the second mode to a third mode.

2. The method of claim 1 wherein the first occurrence of step (i) is initiated by manual actuation.

3. The method of claim 2 wherein occurrences of step (i) after the first occurrence are initiated algorithmically.

4. The method of claim 1 wherein the transmitting of steps (i) and (vi) are performed wirelessly.

5. The method of claim 1 wherein in step (ii) the sensor transmits information wirelessly.

6. The method of claim 1 wherein the information transmitted by the sensor in step (ii) includes identification information pertaining to the sensor.

7. The method of claim 1 wherein the sensor is a first sensor, the method further comprising:
(vii) transmitting a signal to change a second sensor from a power-conserving first mode to an information-providing second mode;
(viii) causing the second sensor to transmit information;
(ix) processing the information from the second sensor;
(x) determining whether the second sensor is operating acceptably, whereby if the determination is that the second sensor is not acceptably operating, repeating step (ix) and if the determination is that the second sensor is acceptably operating, repeating steps (vii), (viii), and (ix) and then proceeding to step (xi);
(xi) determining again whether the second sensor is operating acceptably, whereby if the determination is that the sensor is not acceptably operating, repeating steps (vii), (viii), (ix) and (x) one time, and if the determination is that the second sensor is acceptably operating, proceeding to step (xii);
(xii) transmitting a signal to change the second sensor from the second mode to a third mode.

8. The method of claim 7 wherein the first occurrence of step (vii) is initiated by manual actuation.

9. The method of claim 1 wherein the method is performed in conjunction with at least one sensor installed in a vehicle wheel including a pneumatic tire.

10. The method of claim 7 wherein the first sensor is installed in a motorcycle front wheel and the second sensor is installed in a motorcycle rear wheel.

11. A method for initiating and verifying operation of at least one tire pressure sensor having a plurality of modes, the method comprising:
(i) transmitting a signal to change a sensor from a first mode to a second mode;
(ii) causing the sensor to transmit information;
(iii) processing the information from the sensor;
(iv) determining whether the sensor is operating acceptably, whereby if the determination is that the sensor is not acceptably operating, reprocessing the information from the sensor, and if the determination is that the sensor is acceptably operating, proceeding to step (v);
(v) transmitting a signal for the sensor to be in the second mode;
(vi) causing the sensor to transmit information;
(vii) processing the information from the sensor;
(viii) determining whether the sensor is operating acceptably, whereby if the determination is that the sensor is not acceptably operating, repeating steps (i), (ii), (iii), (iv), (v), and (vii) one time, and if the determination is that the sensor is acceptably operating, proceeding to step (ix);
(ix) transmitting a signal to change the sensor from the second mode to a third mode.

12. The method of claim 11 wherein the first occurrence of step (i) is initiated by manual actuation.

13. The method of claim 11 wherein the transmitting of steps (i), (v) and (ix) are performed wirelessly.

14. The method of claim 11 wherein in steps (ii) and (vi) the sensor transmits information wirelessly.

15. The method of claim 11 wherein the sensor is a first sensor, the method further comprising:
(x) transmitting a signal to change a second sensor from a first mode to a second mode;
(xi) causing the second sensor to transmit information;
(xii) processing the information from the second sensor;
(xiii) determining whether the second sensor is operating acceptably, whereby if the determination is that the second sensor is not acceptably operating, reprocessing the information from the second sensor, and if the determination is that the second sensor is acceptably operating, proceeding to step (xiv);
(xiv) transmitting a signal for the second sensor to be in the second mode;
(xv) causing the second sensor to transmit information;
(xvi) processing the information from the second sensor;
(xvii) determining whether the second sensor is operating acceptably, whereby if the determination is that the second sensor is not acceptably operating, repeating steps (x), (xi), (xii), (xiv), (xv), and (xvi) one time, and if the determination is that the second sensor is acceptably operating, proceeding to step (xviii);
(xviii) transmitting a signal to change the second sensor from the second mode to a third mode.

16. The method of claim 15 wherein the first occurrence of step (x) is initiated by manual actuation.

17. The method of claim 11 wherein the method is performed in conjunction with at least one sensor installed in a vehicle wheel including a pneumatic tire.

18. The method of claim 15 wherein the first sensor is installed in a motorcycle front wheel and the second sensor is installed in a motorcycle rear wheel.

19. A system for initiating and verifying a tire pressure monitoring system, comprising:
a tire pressure sensor having a plurality of modes, including a first mode and a second mode;
a trigger switch for transmitting a signal to the sensor for changing the sensor from the first mode to the second mode, the sensor configured to transmit information upon receipt of the signal;
a receiver for receiving the information transmitted from the sensor and processing the information, the receiver configured to determine whether the sensor is operating acceptably based on the information received from the sensor, the receiver further configured to reprocess the information if determined that the sensor is not acceptably operating and to command the trigger switch to retransmit the signal if determined that the sensor is acceptably operating.

20. The system of claim 19 wherein the trigger switch is further configured to transmit a second signal for changing the sensor from the second mode to a third mode when the receiver determines that the sensor is operating acceptably after retransmission of the signal.

21. The system of claim 19 wherein the trigger switch includes a pushbutton requiring manual actuation to cause the trigger switch to initially send the signal to the sensor.

22. The system of claim 19 wherein the trigger switch and the sensor are configured to wirelessly communicate.

23. The system of claim 19 wherein the sensor is a first tire pressure sensor, the system further including:
a second tire pressure sensor having a plurality of modes, the trigger switch configured to transmit the signal to the second sensor and the sensor configured to transmit second sensor information to the receiver upon receipt of the signal, the receiver configured to receive the second sensor information transmitted from the second sensor and process the second sensor information, the receiver further configured to determine whether the second sensor is operating acceptably based on the second sensor information received from the second sensor, and further configured to reprocess the second sensor information if determined that the second sensor is not acceptably operating and to command the trigger switch to retransmit the signal to the second sensor if determined that the second sensor is acceptably operating.

24. The system of claim 23 wherein the first sensor is installed in a motorcycle front wheel and the second sensor is installed in a motorcycle rear wheel.

25. The system of claim 19 wherein the sensor is installed in a vehicle wheel including a pneumatic tire.

\* \* \* \* \*